Patented June 19, 1934

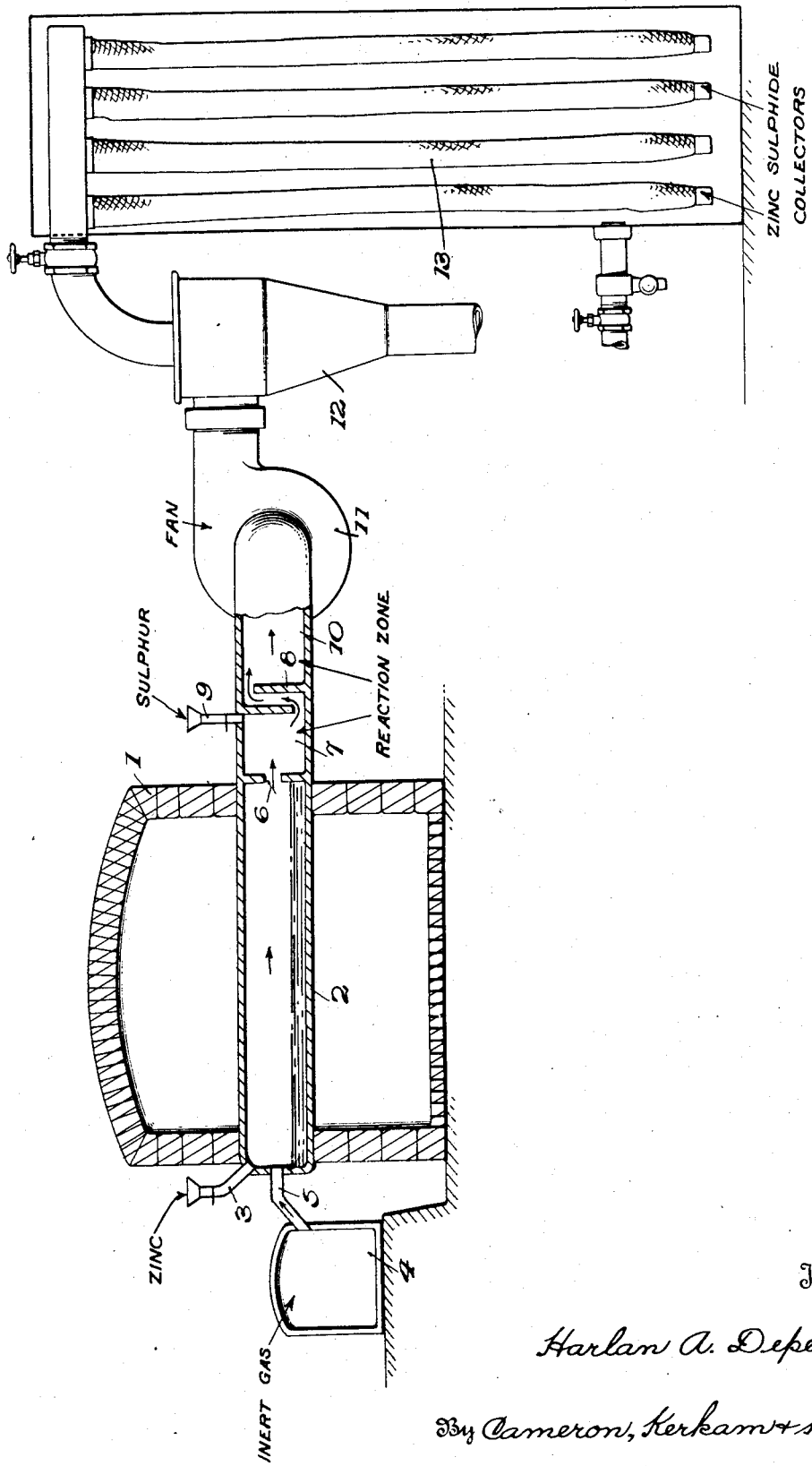

1,963,546

UNITED STATES PATENT OFFICE 1,963,546

PROCESS FOR MAKING PIGMENTS

Harlan A. Depew, Columbus, Ohio, assignor to American Zinc, Lead & Smelting Company, St. Louis, Mo., a corporation of Maine Application August 10, 1932, Serial No. 628,245

14 Claims. (Cl. 23—135)

This invention relates to a process for making pigments such as zinc sulphide and more particularly to a dry process whereby such pigment materials can be prepared by a reaction which results directly in a finely divided material of particle size suitable for use as a pigment.

The pigment properties of zinc sulphide, for example, are known to the art but heretofore this pigment has been manufactured in commercial quantities by so-called wet processes wherein a soluble zinc salt such zinc sulphate or zinc chloride is precipitated by reaction with a soluble sulphide such as barium or hydrogen sulphide. An example of such a pigment is lithopone, which is usually prepared by a reaction between zinc sulphate and barium sulphide, the result being a precipitate including zinc sulphide and barium sulphate which is the usual form in which lithopone is marketed. It is generally believed that the whitening properties of lithopone are due to the zinc sulphide and that the barium sulphate has little whitening power and its value is that of an inert. Moreover, these wet processes involve a succession of steps usually including precipitation, filtration, drying, muffling, quenching, grinding, drying and disintegration and the large number of these steps makes the cost of zinc sulphide comparatively high.

Attempts have been made heretofore to produce zinc sulphide in pigment form by various dry processes. For example, it has been proposed to volatilize zinc sulphide directly from zinc sulphide concentrates or ores, but it is very difficult to distill zinc sulphide and this process has never had practical value. Another method that has been proposed is to heat zinc oxide in finely divided form with sulphur in a partially closed container having a small opening to permit the escape of the sulphur dioxide gas evolved in the reaction. In this process, however, excessive quantities of sulphur are required because the sulphur must react to form not only zinc sulphide but also sulphur dioxide and also because some of the sulphur escapes with the sulphur dioxide. Moreover, this latter process has never been practical except on a small unit basis.

One of the objects of the present invention is to provide a novel process for producing a pigment such as zinc sulphide by a dry reaction between zinc and sulphur which results directly in a material of very fine particle size that is suitable for use as a pigment.

A further object is to provide a novel process for producing a reaction between zinc and sulphur wherein an inert carrying gas is used to convey the products of reaction so that agglomeration is prevented and a material is produced that is of fine particle size and in a form suitable for use as a pigment.

Another object is to provide a novel process for producing a reaction between a metal such as zinc and an element such as sulphur wherein the reacting materials are brought into contact either in the vapor state or in the form of finely divided particles suspended in an inert carrying gas.

A still further object is to provide a novel process for making zinc sulphide pigment which results in a product of extremely fine particle size.

As indicated above, the invention as employed in the manufacture of zinc sulphide involves a direct dry reaction between zinc and sulphur whereby substantially pure zinc sulphide is produced directly in very finely divided form suitable for pigment purposes. This reaction is brought about by volatilizing the sulphur and bringing it into contact while in the vapor state with zinc which has been volatilized also and is in the vapor phase or partially condensed to the state of fine droplets or particles carried in suspension, the volatilized materials being brought together and the products of reaction conveyed away from the reaction zone by a suitable inert carrying gas. Under these conditions the zinc readily combines with the sulphur and the fine particles of zinc sulphide formed are carried away by the inert gas and at the same time allowed to cool so that the resulting product is in finely divided form suitable for use as a pigment without further grinding or disintegration.

The temperatures suitable for the process may vary considerably throughout a considerable range. Having once vaporized the zinc, it is permissible that the temperature at which the reaction takes place should fall below the boiling point of zinc, the condensed zinc vapor being carried in suspension in the inert gas in the form of fine droplets or particles. Sulphur also will exist in the gaseous state in a diluting gas at temperatures below the boiling point of sulphur. Moreover, the reaction between zinc and sulphur is exothermic which may be a factor in causing the reaction to proceed effectively at low temperatures. If the temperature is too low, however, the velocity of the reaction will be too slow and the reaction may be incomplete. On the other hand, if the temperature is too high in commercial practice, there is a danger of forming undesirable impurities firmly on the pigment surface. In practice, when the reaction is between zinc and sulphur, it has been found that a temperature in the neighborhood of 700° C. works very well. At this temperature some of the volatilized zinc may have condensed, but the small particles of condensed zinc remain in suspension in the carrying gas and react readily with the sulphur vapor. The desirable temperature may also vary somewhat depending upon the presence of impurities in the materials treated.

The vaporized or partially vaporized metal can be obtained from any suitable source. For example, metallic zinc may be volatilized directly in a suitable furnace having an inert atmosphere to prevent oxidation, which atmosphere also serves to carry away the metallic vapor. Other methods of providing the metallic zinc vapor may be employed as, for example, the operation of various known processes for making zinc oxide fume from ores and concentrates but under conditions which preclude oxidation of the zinc. In such cases the inert atmosphere is provided by the products of combustion of the fuel and according to the usual operation of such processes consists largely of carbon monoxide and nitrogen. The same or any similar or suitable inert atmosphere can be employed where the metal is volatilized directly, the atmosphere being provided in any suitable way as by means of a gas producer of any suitable type.

The volatilized metallic vapors in the inert atmosphere are carried out of the furnace in any suitable way as by means of a suction fan and conducted to a point at which sulphur vapor is introduced. The sulphur can be vaporized before introduction into the mixture of inert gas and metallic vapor, or sulphur in the solid or liquid state can be introduced directly into the chamber if the temperature is sufficiently high to vaporize the sulphur. The sulphur and metallic vapor are mixed in a suitable combustion chamber, turbulence being preferably provided in any suitable way, as by the use of baffle plates, which turbulence brings the reaction to completion more rapidly.

From the combustion chamber the fume which usually consists almost entirely of zinc sulphide particles suspended in the inert carrying gas is conducted in any suitable way to a bag room where the solid particles of zinc sulphide are separated from the carrying gas. If desired, a settling chamber or cyclone separator can be installed in the system before the materials reach the bag room in order to remove the gritty material.

Since the reaction proceeds to the formation of zinc sulphide with few side reactions, the quantity of sulphur employed need be little more than the theoretical amount required to combine with the zinc. If the amount of sulphur employed is excessive, there will be a tendency for the resultant product to contain some free sulphur. This may be removed in any suitable way, as by reheating the product in an atmosphere of steam whereby the sulphur is distilled out together with any impurities such as tarry material. The amount of sulphur should be but slightly in excess of the theoretical quantity required in order to insure the complete conversion of all of the metallic vapor, and any excess sulphur can be removed by reheating the product to a moderate temperature in the neighborhood of 500° C.

The accompanying drawing shows diagrammatically an apparatus suitable for carrying out a reaction between zinc and sulphur but it is to be expressly understood that the process is in no way dependent upon this particular apparatus or its operation.

In the drawing, the furnace 1 may be of any suitable type and it includes a vessel, pan or retort 2 for the zinc to be vaporized. Zinc may be charged in the vessel 2 by means of an inlet 3, and inert gas from a producer 4 and consisting for example largely of carbon monoxide and nitrogen is introduced into the vessel 2 by means of a pipe 5. Instead of the closed retort 2 and gas producer 4, the furnace 1 as stated above may be operated in such a way as to volatilize zinc from zinc metal or zinc ores or concentrates directly from the furnace grate, the conditions of combustion providing an inert atmosphere serving as a carrying gas.

As shown, the vessel 2 is in the form of a closed retort so that the zinc or other metal is vaporized out of contact with the products of combustion in the furnace, but this is not essential provided the furnace gases are inert to the zinc vapor. The volatilized metal together with the inert carrying gas escapes from the vessel 2 through an opening 6 and into a combustion chamber 7 provided in the form shown with suitable baffle plates 8. Sulphur in solid, liquid or gaseous form is introduced into the combustion chamber through the inlet pipe 9. The inert carrying gas together with vaporized sulphur and metal are drawn through the combustion chamber and through the hot flue 10 in any suitable way as by a suction fan 11, the reaction taking place primarily in the combustion chamber and proceeding to completion in the hot flue. From the fan 11, the inert carrying gas and the suspended particles of zinc sulphide are conveyed to a suitable separator 12 and then to a bag room 13 wherein the particles are collected.

Under the conditions described, the zinc sulphide is formed in very fine particles and these particles are conveyed to the bag room by the inert carrying gas thus preventing agglomeration and providing a final product which is of sufficiently fine particle size to be suitable for use as a pigment without further grinding or disintegration. Where a slight excess of sulphur is present, the product is reheated as described above and is then ready for commercial use.

The usual methods followed in making zinc sulphide result in a product having fairly large particle size, and further processing of the pigment tends to increase the particle size. Another advantage inherent in a process embodying the present invention is the extremely fine particle size which can be obtained so that the pigment is particularly desirable for certain purposes such as reinforcing pigments for rubber.

As an example of the operation of this process, five pounds of sulphur were fed into the combustion chamber during a period of 15 minutes with the resultant formation of eight pounds of zinc sulphide, this reaction being carried out at a temperature of approximately 700° C. and in an atmosphere consisting of carbon monoxide and nitrogen. The final product as determined by analysis consisted substantially of zinc sulphide with a slight excess of free sulphur and the presence of small quantities of impurities. Small quantities of zinc oxide may be present unless care is taken to make sure that the atmosphere is entirely non-oxidizing, but this is so small as not to be objectionable. Part of the excess sulphur introduced into the combustion chamber is separated out in the trail to the bag room and part burned to sulphur dioxide. In other tests the amount of sulphur has been decreased to approximately the amount required by theory to form zinc sulphide with equally satisfactory results.

In some cases it may be desirable to reheat the final product in a current of steam or other inert gas as stated above. This reheating can be carried out in many suitable ways; and if desired the reheating treatment can be carried out in a suitable vertical tube furnace one portion of the furnace being regulated to complete the reaction of uncombined zinc and sulphur and the other portion providing the reheating treatment.

It will be understood that the process is not limited to the specific details stated above such as reaction temperatures, amount and kind of various materials and gases, etc., all of which are capable of variation which will now be apparent to those skilled in the art. Moreover, the principle and method of the invention are not restricted to the manufacture of zinc sulphide but can be employed to produce compounds of other pigment-forming metals such as mercury and lead with sulphur or another element of the sixth group of the periodic system such as tellurium or selenium. In general, the volatilized metal may be produced in any suitable way either by the direct volatilization of the metal in an inert atmosphere or by the reduction of various concentrates or ores under conditions such as to prevent oxidation and to provide a metallic vapor. For example, various types of furnaces commonly employed in the art for the production of zinc oxide are suitable for the present process provided they are operated under non-oxidizing conditions, such as vertical tube furnaces, stationary Wetherill, travelling grate furnaces, etc. It will also be understood that details of the process and the type and kind of apparatus used to carry out the reaction can be varied without departing from the spirit of the invention. Reference is therefore to be had to the appended claims for a definition of the limits of the invention.

What is claimed is:

1. A method for making a finely divided pigment material of particle size suitable for use as a pigment which consists in volatilizing zinc, conveying the zinc vapor in suspension in an inert carrying gas through a reaction zone, introducing sulphur vapor into said reaction zone, and collecting the finely divided particles from the inert carrying gas after the reaction is completed.

2. A method for making a pigment in the form of finely divided particles which consists in volatilizing zinc in the presence of an inert gas, conveying the inert gas together with the metallic vapor into contact with sulphur in a reaction zone, the sulphur being volatilized by the heat of said gas and vapor, withdrawing the inert gas together with the products of reaction from said zone, and separating the products of reaction from the carrying gas.

3. A method for making zinc sulphide in pigment form which consists in volatilizing zinc in the presence of an inert carrying gas, conveying said inert carrying gas together with the metallic vapor through a reaction zone containing sulphur vapor and separating the fine particles of zinc sulphide from the carrying gas.

4. A method for making pigment zinc sulphide which consists in volatilizing zinc in the presence of an inert carrying gas, conveying said gas together with the metallic vapor to a reaction chamber, simultaneously introducing sulphur vapor into said chamber to form zinc sulphide particles, conveying said gas together with the products of reaction from said chamber, and cooling and collecting the zinc sulphide particles.

5. A method for making pigment zinc sulphide which consists in volatilizing zinc in the presence of an inert carrying gas, conveying said gas together with the metallic vapor to a reaction chamber, maintaining said reaction chamber at a temperature above the boiling point of sulphur and introducing sulphur into said chamber to be vaporized therein, conveying said inert gas and the suspended products of reaction out of said reaction chamber, and cooling and collecting said products.

6. A method for making zinc sulphide pigment which consists in volatilizing zinc in the presence of an inert gas, conveying said gas with the metallic vapor in suspension therein continuously through a reaction zone and to a collector, and mixing sulphur vapor with said gas and vapor in the reaction zone, whereby zinc sulphide particles are formed and collected in form suitable for use as a pigment.

7. A method for making zinc sulphide pigment which consists in volatilizing zinc in the presence of an inert gas, conveying said gas with the metallic vapor in suspension therein continuously through a reaction zone and to a collector, and mixing sulphur vapor with said gas and vapor in the reaction zone, while maintaining a state of turbulence therein, whereby zinc sulphide particles are formed and collected in form suitable for use as a pigment.

8. A method for making zinc sulphide pigment which consists in volatilizing zinc in the presence of an inert gas, conveying the inert gas with the zinc vapor carried in suspension therein to a reaction zone while maintaining a temperature of approximately 700° C., mixing sulphur vapor with said gas and metallic vapor in said reaction zone, whereby zinc sulphide particles are formed, and conveying said inert gas with the zinc sulphide particles in suspension therein to a collector while permitting the same to cool, whereby zinc sulphide of particle size suitable for pigment is formed.

9. A method for making pigment in finely divided form which consists in volatilizing a pigment-forming metal in the presence of an inert carrying gas, conveying said inert gas together with the suspended metallic vapor through a reaction zone and to a collector, mixing a volatilized pigment-forming element of the sixth group of the periodic system with said gas and metallic vapor in said reaction zone while maintaining the temperature in said zone high enough to vaporize said element, and collecting the finely divided particles of pigment compound from said carrying gas.

10. A method for making pigment in finely divided form which consists in volatilizing a pigment-forming metal selected from the group consisting of zinc, mercury and lead in the presence of an inert carrying gas, conveying the gas and metallic vapor to a reaction chamber, mixing with said gas and vapor a vaporized pigment-forming element selected from the group consisting of sulphur, selenium and tellurium, and conveying said gas and products of reaction from the reaction chamber and collecting the finely divided particles of pigment compound from the gas.

11. A method for making a finely divided pigment material of particle size which consists in volatilizing zinc, mixing the zinc vapor with an inert gas, conveying the inert gas together with the vapor through a reaction zone, introducing sulphur in quantity approximately the chemical equivalent of the zinc vapor into said reaction zone, withdrawing the inert gas together with the products of reaction from said zone and separating the products of reaction from the inert gas.

12. A method for making pigment in a finely divided form which consists in volatilizing a pigment-forming metal, mixing the vapor with an inert carrying gas, conveying said inert gas together with the suspended metallic vapor to a reaction zone, mixing a pigment-forming element of the sixth group of the periodic system with said gas and metallic vapor in said reaction zone while maintaining the temperature in said zone high enough to vaporize said element, and separating the finely divided particles of pigment compound from said carrying gas.

13. A method for making a zinc sulphide pigment which consists in vaporizing zinc, mixing the zinc vapor with an inert carrying gas, conveying said gas with the zinc vapor in suspension therein continuously through a reaction zone and to a collector, and mixing sulphur with said zinc vapor and carrying gas in said reaction zone in an amount approximately the chemical equivalent of the zinc vapor, whereby the zinc sulphide particles resulting from the reaction are rapidly cooled and separated from the inert gas in the collector.

14. A method for making zinc sulphide pigment which consists in volatilizing zinc, mixing the zinc vapor with an inert gas, conveying said gas with the zinc vapor in suspension therein continuously through a reaction zone and to a collector, mixing sulphur vapor with said zinc vapor and inert gas, the sulphur vapor being in an amount approximately the chemical equivalent of the zinc vapor, maintaining a state of turbulence in said reaction zone, and separating the zinc sulphide from the inert gas in the collector.

HARLAN A. DEPEW.